United States Patent [19]

Ney

[11] 4,375,123

[45] Mar. 1, 1983

[54] METHOD AND APPARATUS FOR TIGHTENING THREADED FASTENER ASSEMBLIES

[75] Inventor: Andrew L. Ney, Lafayette Hill, Pa.

[73] Assignee: SPS Technologies, Inc., Jenkintown, Pa.

[21] Appl. No.: 137,950

[22] Filed: Apr. 7, 1980

[51] Int. Cl.³ ............................................. B23P 19/06
[52] U.S. Cl. ..................................... 29/407; 29/240; 73/761; 173/12
[58] Field of Search .................... 29/240, 407; 73/139, 73/761, 862.21, 862.22, 862.23, 862.24; 173/1, 12

[56] References Cited

U.S. PATENT DOCUMENTS

| | | | |
|---|---|---|---|
| 3,693,726 | 9/1972 | Hornig et al. | 173/12 |
| 3,973,434 | 8/1976 | Smith | 73/139 |
| 3,974,685 | 8/1976 | Walker | 73/761 |
| 3,974,883 | 8/1976 | Sigmund | 173/12 |
| 3,982,419 | 9/1976 | Boys | 73/139 |
| 4,104,778 | 8/1978 | Vliet | 29/407 |
| 4,104,780 | 8/1978 | Sigmund | 29/407 |
| 4,106,176 | 8/1978 | Rice et al. | 29/407 |
| 4,161,221 | 7/1979 | Carlin et al. | 173/1 |
| 4,179,786 | 12/1979 | Eshghy | 29/407 |
| 4,259,869 | 4/1981 | Carlin | 73/761 |

Primary Examiner—Ervin M. Combs
Attorney, Agent, or Firm—Aaron Nerenberg

[57] ABSTRACT

Apparatus and method for tightening assemblies held together by threaded fasteners. Prior to tightening, the gradients of a selected number of possible torque-rotation curves for the assembly are established and stored along with the associated tightening torques required to induce a desired preload in the fastener when the assembly is tightened according to the selected torque-rotation curves. As torque and rotation are imparted to the fastener to tighten the assembly, the gradient of the actual torque-rotation curve through which the assembly is taken is calculated. The calculated gradient is compared with the stored gradients to derive that tightening torque which is associated with that stored gradient closest in magnitude to the calculated gradient. The derived tightening torque is used to control the torque applied to the fastener.

9 Claims, 3 Drawing Figures

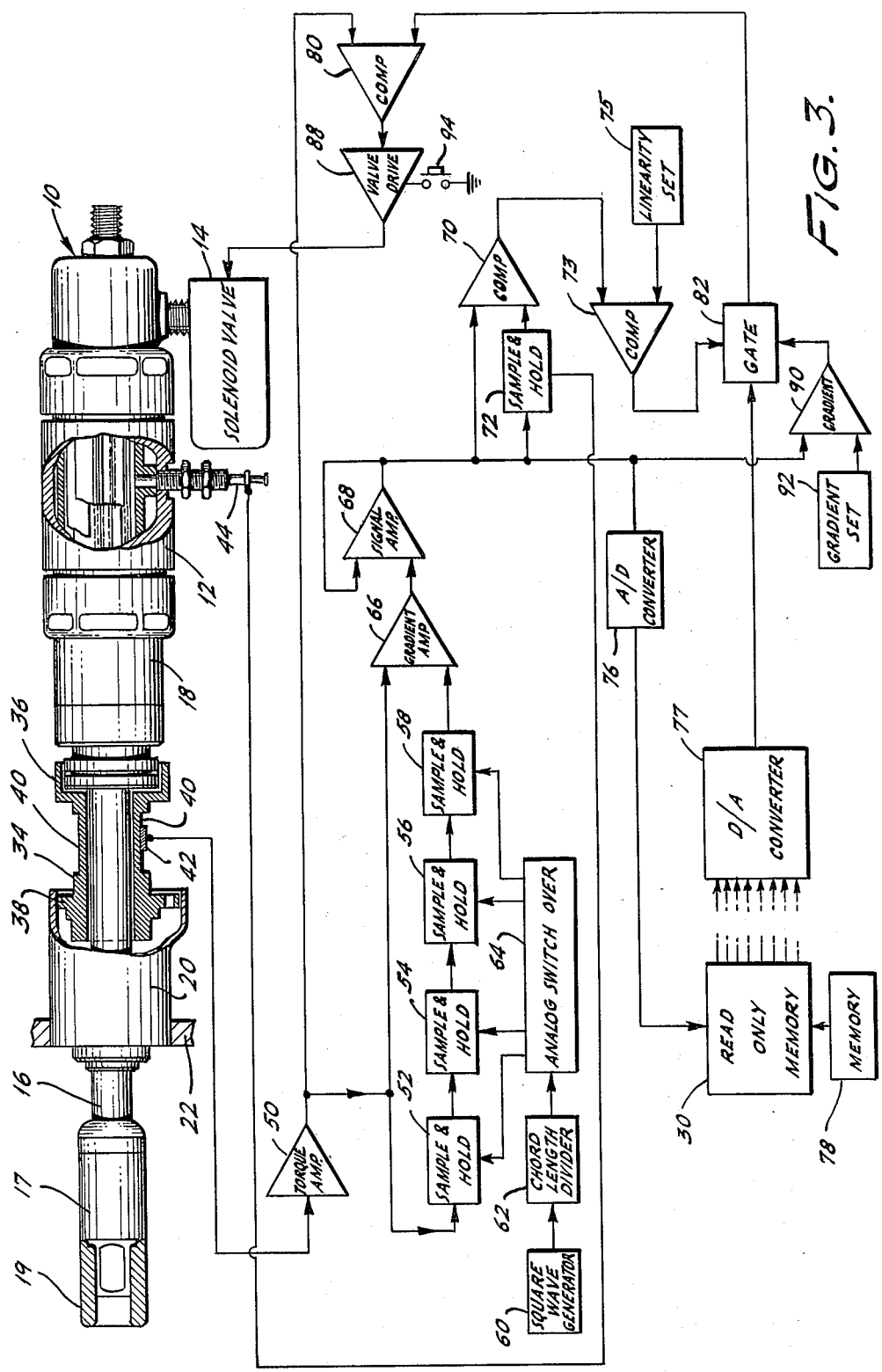

METHOD AND APPARATUS FOR TIGHTENING THREADED FASTENER ASSEMBLIES

DESCRIPTION

1. Technical Field

The present invention relates, in general, to the tightening of assemblies and, in particular, to an apparatus and method for tightening assemblies which are held together by threaded fasteners.

2. Background Art

The precise clamping load of a threaded fastener is extremely important in determining whether or not a joint assembly, including the fastener, will fail in service. Consequently, threaded fasteners should be installed in a controlled manner, whereby the clamping load required to maintain the integrity of the joint assembly is achieved.

One common technique for controlling the tightening of threaded fasteners is to use torque control apparatus by which a specific predetermined torque is applied in an attempt to attain a desired preload for particular thread and frictional conditions. Such an approach has the disadvantage that there may be variations in the torque/tension relationship from one tightening cycle to the next for the same assembly or same type of assembly due to different friction conditions, whereby clamping loads varying by as much as ±30% may be produced for a given applied torque.

Another known technique which is not dependent upon frictional conditions involves measuring the elongation of the fastener as the assembly is tightened. While this approach is capable of developing the accuracy required to achieve the desired clamping load, as a practical matter, in most cases direct measurement of elongation is either impossible or commercially unfeasible.

Yet another tightening technique which has been employed in the past in installing threaded fasteners is based on angle control. Given an estimate of the elongation required to achieve a desired clamping load, the threaded fastener is turned through a precise angle of tightening which will produce the necessary elongation. The disadvantage of this approach results from the difficulty in identifying the initiation of the measurement of rotation of the fastener to produce the desired clamping load. U.S. Pat. Nos. 4,104,778 and 4,104,780 are directed to this technique and address the problem of identifying the point for initiating the measurement of rotation.

U.S. Pat. No. 3,982,419 is directed to an apparatus and method which involve tightening threaded fasteners into the yield region of the fasteners. Under such conditions, the disadvantages of the other techniques described above are avoided and the integrity of the assembly is greatly enhanced. There are, however, applications where the threaded fastener preferably is tightened to some point within its elastic range. For example, in the installation of certain high strength bolts, tightening to some clamping load below the elastic limit of the fastener will provide the desired condition.

DISCLOSURE OF INVENTION

Accordingly, it is an object of the present invention to provide a new and improved apparatus and method for tightening an assembly including a threaded fastener.

It is another object of the present invention to provide an apparatus and method for tightening an assembly including a threaded fastener which involve tigthening the fastener to a clamping load within its elastic range.

It is yet another object of the present invention to provide an apparatus and method for tightening an assembly including a threaded fastener which are relatively accurate and efficient.

In accordance with the apparatus and method of the present invention, an assembly, including a threaded fastener, is tightened to a desired condition by imparting torque and rotation to the fastener and calculating from the torque and rotation imparted to the fastener the instantaneous gradient of the tightening region of a torque-rotation curve which could be plotted for the joint assembly being tightened. Prior to tightening, there is established the relationship between gradients of the possible torque-rotation curves for the assembly and the torques required to induce the desired preload in the fastener when the fastener is tightened according to the possible torque-rotation curves. The particular torque required to achieve the desired tightened condition for the actual torque-rotation curve is derived by identifying which gradient of the possible torque-rotation curves is closest in magnitude to the calculated gradient.

BRIEF DESCRIPTION OF DRAWINGS

Referring to the drawings:

FIG. 3 shows a preferred embodiment of tightening apparatus constructed in accordance with the present invention.

BEST MODE OF CARRYING OUT THE INVENTION

Figure 1:
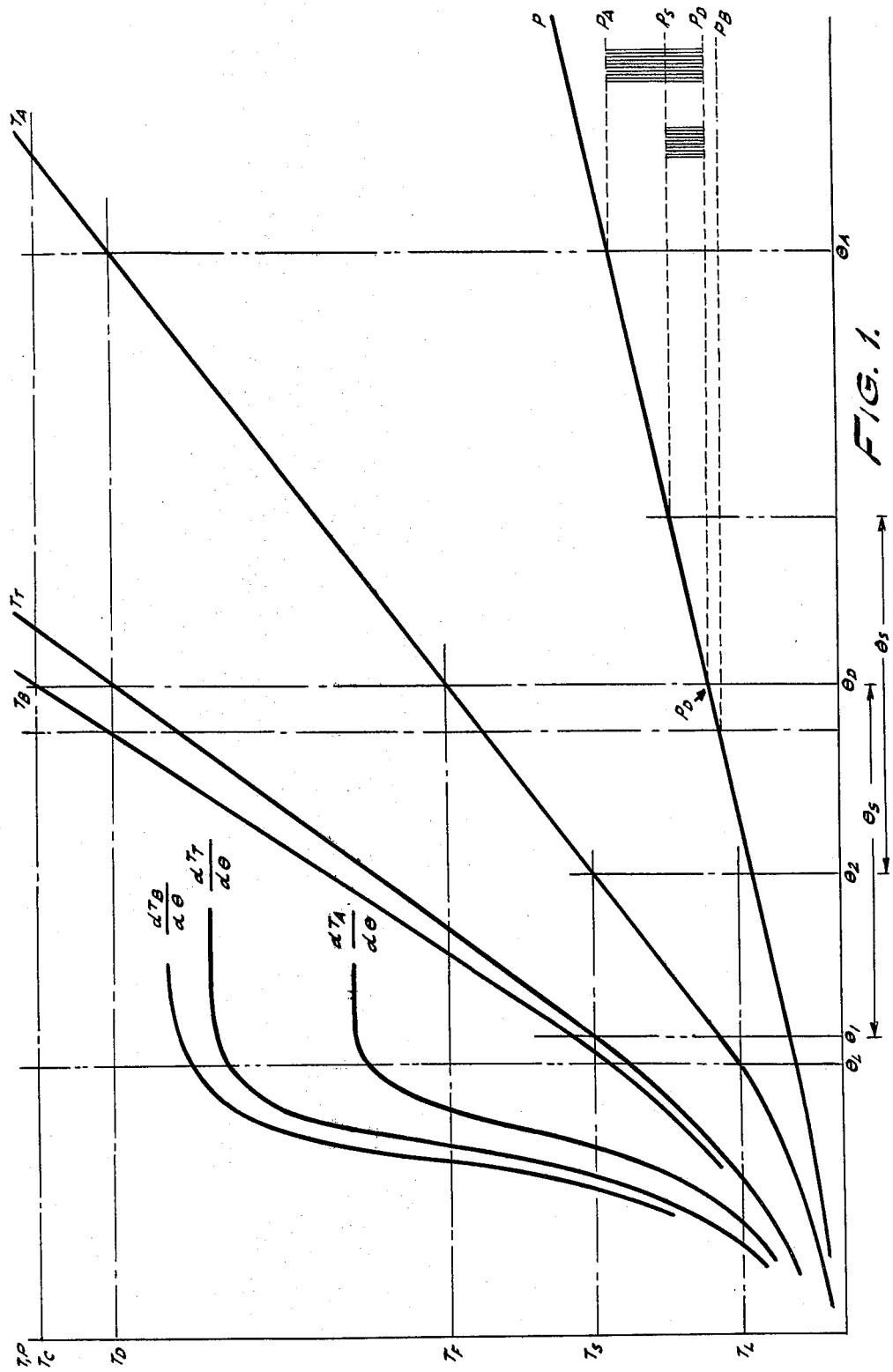
FIG. 1 shows the idealized tightening curves associated with a typical assembly held together by a threaded fastener.

Referring to FIG. 1, the tightening curves which are illustrated are idealized in that they are shown to have smooth and linear portions, when, in fact, under practical conditions they are somewhat irregular due to electrical and mechanical noise and the linear portions typically are, at best, substantially linear, rather than truly linear. The tightening technique of the present invention may be most readily understood by dealing with idealized curves. Although the differences between ideal and practical conditions are well understood by those skilled in the art, the description of the invention will make reference to the manner in which certain practical effects may be handled.

The curve identified by P is a preload-rotation curve and $P_D$ represents the desired, predetermined preload which is to be induced in the threaded fastener when the assembly has been tightened to the desired degree. This curve may be derived either by calculation or experimentation. Given the physical characteristics of the assembly, including the threaded fastener, curve P may be derived from the equation which defines the preload versus angle relationship, $P = K\theta$. Alternatively, curve P may be derived by actual measurements of preload induced in a fastener in a sample assembly as it is being tightened.

The curve identified by $T_T$ is the theoretical torque-rotation curve for the assembly. This curve also may be derived by calculation or experimentation. Because there is likely to be a variety of torque-rotation curves for a given assembly, curve $T_T$, when derived experimentally, is developed by taking the average of several such curves.

Curve $T_A$ is the actual torque-rotation curve for the assembly. This curve is derived "on-the-fly" as the particular assembly is being tightened by sensing the torque and rotation imparted to the threaded fastener to tighten the assembly.

Curves $T_A$ and $T_T$ are shown to be different to reflect the different friction conditions from one tightening cycle to another of the same assembly which will result in different torque-rotation curves for different tightening cycles of the same assembly. This situation illustrates the disadvantage of torque control apparatus mentioned previously. If the shut-off equipment is set to a given torque level $T_D$ to achieve, according to curves $T_T$ and P, the desired preload $P_D$ and, in fact, the actual torque-rotation curve for the tightening cycle is $T_A$, the fastener rotation will be taken to $\theta_A$ rather than $\theta_D$. This will result in an induced preload $P_A$ rather than the desired preload $P_D$. The shaded area between $P_A$ and $P_D$ indicates the variation in induced loads in the threaded fastener for a variation in torque-rotation curves between $T_T$ and $T_A$.

Angle control tightening, also mentioned previously, is based on that portion of the preload-rotation curve where the two are linearly related. Knowing this relationship and knowing when it starts, a desired predetermined preload may be induced in the threaded fastener by imparting a controlled amount of rotation to the fastener. The problem, in the past, has been to determine the starting point for imparting this controlled amount of rotation. The prevalent practice is to sense a prescribed torque level and impart the fixed amount of rotation to the fastener starting at the point. For a prescribed torque level of $T_S$, the starting points for imparting a tightening angle of $\sigma_S$ are spaced apart by an angle between $\theta_1$ and $\theta_2$ equal to the spread of the $T_T$ and $T_A$ curves at the $T_S$ torque level. FIG. 1 shows the variation in induced loads in the shaded area between $P_D$ and $P_S$ when the same amount of rotation $\theta_S$ is imparted to a threaded fastener but the starting points vary between $\theta_1$ and $\theta_2$.

In accordance with the present invention, the desired, predetermined preload to be induced in a threaded fastener is achieved as follows. A family of curves corresponding to the relationship between preload and torque gradient for a plurality of tightening torques is established in advance of the tightening of the assembly.

The same tightening torque $T_D$, applied to an assembly having a torque-rotation curve $T_T$ or $T_A$ or $T_B$, will induce preloads $P_D$ or $P_A$ or $P_B$, respectively. The gradient of curve $T_T$ is identified as $(dT_T)/(d\theta)$, the gradient of curve $T_A$ is identified as $(dT_A)/(d\theta)$, and the gradient of curve $T_B$ is identified as $(dT_B)/(d\theta)$. At the onset of the substantially linear tightening portions of curves $T_T$, $T_A$ and $T_B$, their gradients become substantially constant. Because the slope of curve $T_B$ is greater than the slope of curve $T_T$ which, in turn, is greater than the slope of curve $T_A$, gradient $(dT_B)/(d\theta)$ is greater than gradient $(dT_T)/(d\theta)$ which, in turn, is greater than gradient $(dT_A)/(d\theta)$. By selecting yet other possible torque-rotation curves for the assembly and determining the gradients of the substantially linear tightening portions of these curves, a preload versus gradient curve, such as the one identified in FIG. 2 as $T_D$, may be plotted for the tightening torque $T_D$. This curve provides a measure of the variation in the preloads induced in the fastener as a function of the slopes of the possible torque-rotation curves for an applied tightening torque $T_D$. Thus, by comparing a calculated gradient of the actual torque-rotation curve with the gradient values of the curve of FIG. 2, the preload which will be induced in the fastener may be determined for the particular calculated gradient. Likewise, similar curves for other selected tightening torques may be developed. The curves identified in FIG. 2 as $T_F$ and $T_C$ correspond to the preloads induced in the fastener as a function of the gradients of the possible torque-rotation curves of the assembly when tightening torques $T_F$ and $T_C$, respectively, are applied to the fastener. The number of such curves and the torque interval between these curves is selected to suit the requirements of the particular application. As will become evident, the smaller the torque interval between these curves, the greater the accuracy of the invention in developing the desired preload in the fastener.

Figure 2:
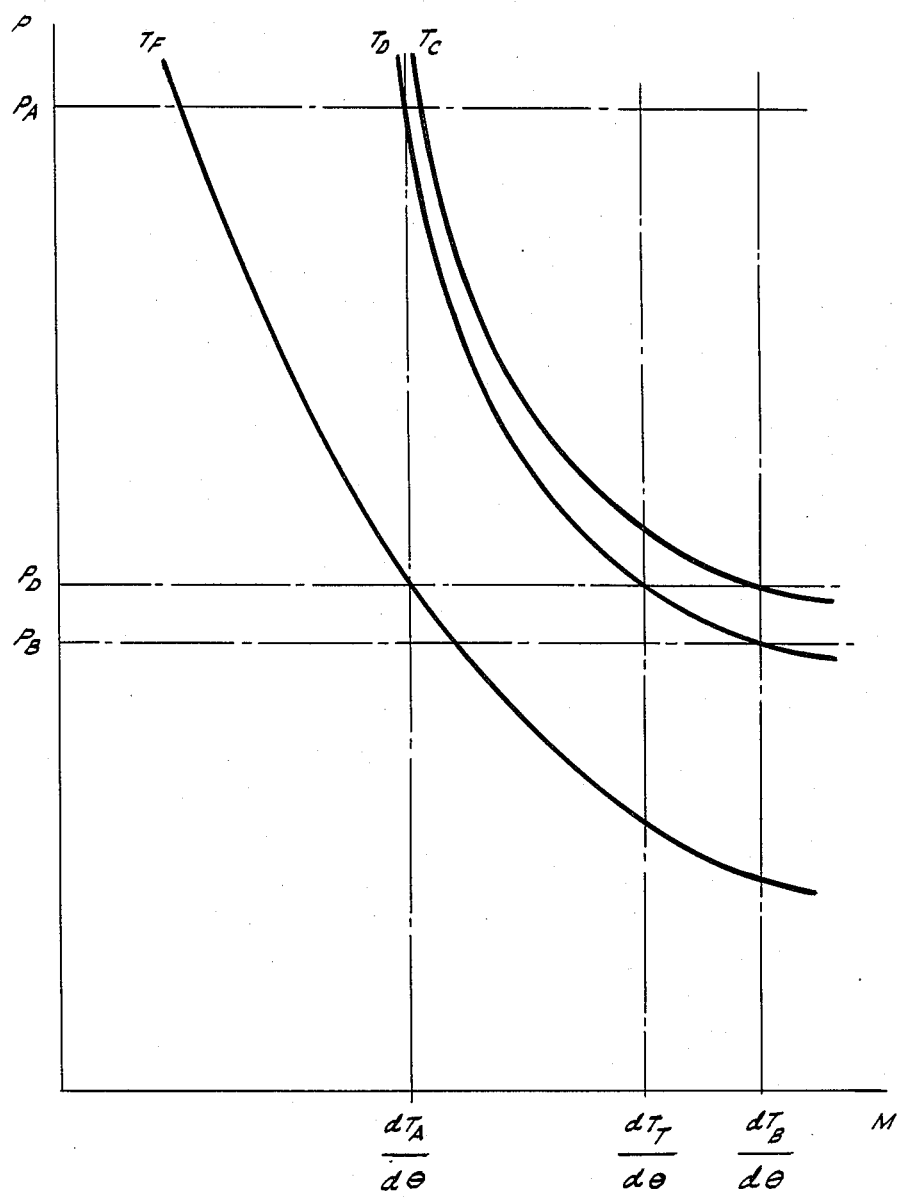
FIG. 2 shows curves useful in understanding the apparatus and method of the present invention.

A horizontal sampling of torques for a selected preload in FIG. 2 corresponds to a vertical sampling of the substantially linear tightening portions of the torque-rotation curves in FIG. 1 at a rotation angle which results in the selected preload being induced. For example, in FIG. 2, for a selected preload $P_D$, curves $T_F$, $T_D$ and $T_C$ are intersected at gradients $(dT_A)/(d\theta)$, $(dT_T)/(d\theta)$ and $(dT_B)/(d\theta)$, respectively. In FIG. 1, for a rotation angle $\theta_D$ at which, according to preload-angle curve P, preload $P_D$ is induced, curves $T_A$, $T_T$ and $T_B$ are intersected at torque levels $T_F$, $T_D$ and $T_C$, respectively.

The family of preload-gradient curves in FIG. 2 provides an indication of the relationship between the actual torque-rotation curve through which the assembly is taken as it is being tightened and the theoretical torque-rotation curve for the assembly. As torque and rotation are imparted to the threaded fastener, the gradient of the substantially linear tightening portion of the actual torque-rotation curve is calculated. The intersection, on the FIG. 2 torque curves, of this calculated gradient and the desired preload identifies the tightening torque required to induce this preload when applied on a torque-rotation curve from which the gradient was calculated. In view of the system components selected to describe a preferred embodiment of the present invention, it will be understood that the intersection of the calculated gradient and the desired preload will not always fall on one of the torque curves of FIG. 2. When the intersection of the calculated gradient and the desired preload falls between two of the torque curves in FIG. 2, that torque curve closest to the intersection is selected as the tightening torque. This, however, will produce a slightly different induced preload from the desired preload. Thus, when the term "desired tightened condition" is used herein, it is not intended to mean only the exact "desired preload" established in advance. Rather, this term applies to a reasonable range for the preloads ultimately developed which range is smaller than the variations developed by conventional torque control tightening.

FIG. 3 is a diagram of a preferred embodiment of tightening apparatus constructed in accordance with the present invention. This apparatus includes driving means for imparting torque and rotation to a fastener to tighten an assembly held together by the fastener. The driving means may be a wrench 10, having an air motor 12, the operation of which is controlled by a suitable solenoid valve 14, and which drives an output shaft 16 through a speed-reducing gear box 18 so that the output shaft does not rotate at the same high speed of the motor. Output shaft 16 carries an adapter 17 for attachment with a bit driver 19 and is mounted in a suitable rotary bearing assembly 20 facilitating rotation of and taking up any bending stresses in the output shaft. Bearing assembly 20 may be mounted on a rigid frame 22 but use of the frame is not necessary for the practice of the invention. At this point it should be noted that while motor 12 has been described as an air motor, it may be of any suitable type, for example, electric, hydraulic or any combination of pneumatic, electric or hydraulic. It should also be noted that the apparatus thus far described is generally conventional and need not be explained in greater detail.

The tightening apparatus further includes torque sensing means responsive to the drive means for developing a first torque signal representative of the torque imparted to the threaded fastener. Such means may include a torque cell 34 located between gear box 18 and bearing assembly 20. Torque cell 34 develops a signal representative of the instantaneous torque being imparted to the fastener. Torque cell 34 includes a first mounting base 36 securing the cell to gear box 18 and a second mounting base 38 securing it to bearing assembly 20. Extending axially of the wrench between mounting bases 36 and 38 are a plurality of strut members 40 which are somewhat deformable, that is, they are relatively rigid members capable of twisting somewhat about the axis of the wrench. When wrench 10 is operative to tighten a fastener, the reaction torque action thereon causes strut members 40 to twist about the axis of the wrench, the amount of twisting being proportional to the reaction torque which, of course, is equal to and opposite the torque being applied to the fastener. Each strut member 40 carries a strain gauge 42 which is connected to a Wheatstone bridge circuit (not shown) to develop an electric signal representative of the instantaneous torque being applied to the fastener. It should be noted that instead of strain gauges, contacting or proximity displacement gauges could be used to develop the electric signal representative of the torque being imparted to the fastener. In addition, the exact form of the torque cell 34 may vary somewhat. For example, struts 40 may be replaced by a somewhat deformable cylindrical member, if desired.

The tightening apparatus further includes angle sensing means responsive to the driving means for developing an angle signal representative of the rotation imparted to the threaded fastener. Such means may include a proximity probe 44 mounted through the housing of motor 12 adjacent to and radially spaced from rotary vanes 46 in the motor. Proximity probe 44 may be in the form of an induction coil which develops an electric signal when metal passes through its magnetic field. Thus, as vanes 46 rotate when the fastener is being tightened, signals are provided by proximity probe 44 which represent fixed increments of rotation of the fastener. The size of the increments depends on the number of vanes 46 in motor 12 and the gear ratio of gear box 18. It should be understood that proximity probe 44 may be arranged to cooperate with one of the gears in gear box 18 in a similar manner.

Also included in the tightening apparatus of FIG. 3 are gradient calculating means responsive to the first torque signal and the angle signal for developing a calculated gradient signal representative of the gradient of the substantially linear tightening portion of the actual torque-rotation curve $T_A$. In addition, such means also develop a gate signal at the onset of the substantially linear tightening portion of torque-rotation curve $T_A$. In particular, the output signal from torque cell 34, representative of the instantaneous torque being imparted to the fastener, is supplied to a torque amplifier 50 which amplifies the torque signal to a level at which it is compatible with the rest of the system. From amplifier 50, the torque signal is fed through shift register means which comprise a series of charge coupled devices in the form of sample and hold circuits 52, 54, 56 and 58. The shift register means are clocked by signals representative of fixed angular increments of rotation of the threaded fastener. Specifically, signals from proximity probe 44, which are in the form of spike shaped pulses, are fed to a square wave generator 60 which shapes the signals and feeds the shaped signals through a chord length divider 62 to an analog switch driver 64 which sequentially clocks sample and hold circuits 52, 54, 56 and 58. Chord length divider 62 is a suitable divider circuit which electronically divides the pulses from square wave generator 60 by one, two, four, eight, sixteen or thirty-two so that every pulse, or every second pulse, or every fourth pulse, etc. is used to clock the shift register.

Analog switch driver 64, although not necessary, assures that each sample and hold circuit has discharged its stored signal before receiving a new signal. Accordingly, analog switch driver 64 sequentially clocks the sample and hold circuits first clocking circuit 52, then circuit 54, then circuit 56, and finally circuit 58. Thus, sample and hold circuit 58 has discharged its stored signal prior to receiving a new signal from sample and hold circuit 56 and likewise for the remaining sample and hold circuits. The output from sample and hold circuit 58 is representative of torque a fixed increment of rotation prior to that particular instant and is fed to a gradient comparator 66 in the form of a conventional differential amplifier which also receives an input signal, representative of the instantaneous torque being applied to the fastener, directly from torque amplifier 50. Gradient comparator 66 subtracts its two input signals and develops an output signal representative of the instantaneous torque gradient of torque-rotation curve $T_A$. In particular, the two inputs to comparator 66 are samples of the torque signal taken at different rotational positions of the fastener, one being the torque at that particular position of the fastener and one, delayed by sample and hold circuits 52, 54, 56 and 58, being the torque at a previous position of the fastener. Thus, the output of comparator 66 represents the change in the torque signal over a fixed increment of rotation of the fastener. The gradient signal from gradient comparator 66 is fed to a suitable signal amplifier 68 which amplifies the gradient signal to a magnitude compatible with the rest of the system.

From the foregoing, it is seen that the gradient signal is developed by comparing the torques being applied to the fastener at different times to develop indications of the changes in torque over fixed increments of rotation imparted to the fastener. By selecting the appropriate division to be made in chord length divider 62, it is possible to adjust the chord length over which the gradient is being calculated. In this way, the apparatus may be adjusted to distinguish between actual torque changes and electrical and mechanical noise.

The output of signal amplifier 68 is supplied simultaneously to a comparator 70 and a sample and hold circuit 72 which is clocked by signals from proximity probe 44. Comparator 70 also may be in the form of a conventional differential amplifier which subtracts its two inputs. The combination of comparator 70 and sample and hold circuit 72 serves to develop a gate signal at the onset of the substantially linear tightening portion of the torque-rotation curve. In particular, the two inputs to comparator 70 are samples of the gradient signal taken at different rotational positions of the fastener, one being the gradient at that particular position of the fastener and one, delayed by sample and hold circuit 72, being the gradient at a previous position of the fastener. Thus, the output of comparator 70 represents the change in the gradient signal over a fixed increment of rotation of the fastener. When operating in the substantially linear tightening portion of curve $T_A$, the gradient signal $(dT_A)/(d\theta)$ is substantially constant. Therefore, if the two angle displaced gradient signal inputs to the comparator are the same, the subtraction operation performed by the comparator yields a zero and the onset of the substantially linear tightening portion is sensed. Comparator 70 is conditioned to provide a distinct output signal when this occurs.

As stated previously, the tightening curves shown in FIG. 1 are idealized representations of what actually occurs under practical conditions. In order to sense the onset of a substantially linear tightening portion rather than a truly linear tightening portion, comparator 70 may be conditioned to provide a gate signal when the change in the two gradient inputs to the comparator is less than a prescribed amount. In other words, if the gradient signal supplied to comparator 70 directly from signal amplifier 68 differs from the delayed gradient signal supplied to comparator 70 through sample and hold circuit 72 by less than a preset amount, the comparator is effective to sense the onset of a substantially linear gradient. Such a modification may be built into comparator 70 or yet another comparator 73 may be provided at the output of comparator 70. The gate signal developed by comparator 70 is compared against a reference established by a linearity set circuit 75 and when the gate signal is equal to or less than the reference, comparator 73 passes the gate signal through. Linearity set circuit 75 may be in the form of a suitable potentiometer.

It should be noted that operation in the substantially linear tightening portion may be assured other than by sensing the onset of the substantially linear tightening portion. Instead, the gate signal may be derived from a predetermined snug torque setting.

The FIG. 3 tightening apparatus also includes means for supplying:

(1) a plurality of gradient signals representative of the gradients of the substantially linear tightening portions of a plurality of possible torque-rotation curves for the assembly; and (2) a plurality of torque signals, one associated with each of the possible torque-rotation curves and representative of the tightening torque required to induce a desired preload in the fastener when the fastener is tightened according to the associated torque-rotation curve.

Such means may include a read only memory system 30 of conventional construction and operation which stores the gradient signals representative of the gradients of the selected possible torque-rotation curves and the associated tightening torques. In effect, read only memory system 30 stores curves such as are shown in FIG. 2 except that the storage is of discrete gradients and tightening torques at selected preloads rather than smooth continuous curves. The smoothness of the curves is determined by the number of possible torque-rotation curves and preload levels which are selected and the torque interval between these curves. Read only memory system 30 is so arranged that a calculated gradient input from signal amplifier 68 may be compared to each stored gradient at a desired preload level and when the stored gradient closest to the calculated gradient is identified, the torque signal associated with this stored gradient is derived. Accordingly, the calculated gradient signal from signal amplifier 68, being in analog form, is converted into digital form by an analog-to-digital convertor 76 of conventional construction and operation and the digital form signal is supplied to read only memory system 30. The calculated gradient signal is converted into digital form because the gradient signals stored in read only memory system 30 are in digital form, whereby the function performed by the read only memory system is facilitated. The calculated gradient signal is compared with the stored gradient signals by read only memory system 30 and upon identification of the stored gradient signal closest to the calculated gradient signal, a torque signal representative of the torque associated with the stored gradient is derived from the read only memory system. This signal represents the torque required to develop the desired tightened condition in the fastener. The output from read only memory system 30 is supplied to a digital-to-analog convertor 77 which converts this output into analog form.

The embodiment of the invention shown in FIG. 3 includes the facility for selecting one of a plurality of desired preloads as illustrated in the curves of FIG. 2. Read only memory system 30 is arranged so that the calculated gradient signal from A/D converter 76 may be compared with the stored gradient signals at different selected desired preloads to derive the appropriate torque signal. For example, if the calculated gradient corresponds to an actual torque-rotation curve $T_A$, the torque signal derived for a desired preload $P_D$ represents a torque level $T_F$. For the same torque-rotation curve $T_A$, but with a desired preload $P_A$, the torque signal derived from read only memory system 30 will represent a torque level $T_D$. A memory system 78 serves to select the desired preload. It should be noted that this selection facility may be built directly into read only memory system 30.

The tightening apparatus of FIG. 3 also includes control means responsive to the tightening torque signal at the output of D/A converter 77 for stopping the driving means. The control means may include comparison means responsive to the torque signal from torque amplifier 50 and the derived tightening torque signal supplied by D/A converter 77 for comparing the torque imparted to the threaded fastener with the derived tightening torque and for developing a control signal when the two are equal. The derived tightening torque signal is supplied to a comparator 80 through a gate circuit 82, while the output from torque amplifier 50 is supplied to comparator 80 directly. So long as there is a difference between the two inputs to comparator 80, the comparator develops an output signal representative of this difference. When the two inputs to comparator 80 are the same, namely after the torque level imparted to the threaded fastener is equal to the derived tightening torque represented by the output from D/A converter 77, comparator 80 develops a control signal. Comparator 80 is conditioned to provide a distinct output signal when the two inputs to the comparator are equal.

Gate circuit 82 is conditioned to inhibit passage of the output signal from D/A converter 77 until the onset of the substantially linear tightening portion of the actual torque-rotation curve has been sensed. Only after the gate signal developed by comparator 70 has been passed by comparator 73 to gate circuit 82 is the output of D/A converter 77 passed to comparator 80.

The control means also may include a valve drive circuit 88 which serves to supply the control signal, developed by comparator 80, to solenoid valve 14 to shut down the drive of wrench 10. When comparator 80 develops the control signal, valve drive circuit 88 senses this distinct output signal and causes solenoid valve 14 to shut down the drive of wrench 10. Valve drive circuit 80 may be in the form of a suitable amplifier which amplifies the control signal to a level sufficient to cause solenoid valve 14 to shut down the drive of wrench 10.

To assure that the output from comparator 80 does not inadvertently shut down the drive of wrench 10 during the non-linear tightening portion of the torque-rotation curve, gate circuit 82 receives an additional input signal from a gradient comparator 90. Instantaneous gradient signals are fed from signal amplifier 68 to gradient comparator 90 which also receives an input signal from a gradient set circuit 92. This circuit may be in the form of a suitable potentiometer. The gradient set level is selected by considering the gradient level at which the onset of the substantially linear tightening portion is estimated and the preload which is to be induced into the fastener when the assembly has been tightened to the desired degree. When the level of the instantaneous gradient from signal amplifier 68 exceeds the level set by gradient set circuit 92, gradient comparator 90 provides a signal to gate circuit 82 which allows the derived tightening torque signal from D/A converter 77 to be supplied to comparator 80. Thus, until gate circuit 82 is conditioned to permit signals from D/A converter 77 to pass to comparator 80, the drive of wrench 10 will not be shut down prematurely.

A reset switch 94 is provided to clear the circuits and prepare the tightening apparatus for a new tightening operation with another fastener.

While in the foregoing there has been described a preferred embodiment of the invention, it should be understood to those skilled in the art that various modifications and changes can be made without departing from the true spirit and scope of the invention as recited in the claims.

I claim:

1. Apparatus for tightening an assembly including a threaded fastener to a desired preload comprising:
driving means for imparting torque and rotation to the fastener to tighten said assembly, the actual torque-rotation curve for said assembly having a non-linear tightening portion followed by a substantially linear tightening portion;
torque sensing means responsive to said driving means for developing a first torque signal representative of the torque imparted to said fastener;
angle sensing means responsive to said driving means for developing an angle signal representative of the rotation imparted to said fastener;
gradient calculating means responsive to said first torque signal and said angle signal for developing a calculated gradient signal representative of the calculated gradient of said substantially linear tightening portion of said actual torque-rotation curve;
means for supplying (1) a plurality of gradient signals representative of the gradients of the substantially linear tightening portions of a plurality of possible torque-rotation curves for said assembly, and (2) a plurality of tightening torque signals, one associated with each of said possible torque-rotation curves and representative of the tightening torque required to induce a desired preload in said fastener when said fastener is tightened according to the associated torque-rotation curve;
means responsive to said calculated gradient signal and said plurality of gradient signals for deriving from said plurality of torque signals that tightening torque signal associated with that possible torque-rotation curve which has a substantially linear tightening portion having a gradient closest in magnitude to said calculated gradient of said substantially linear tightening portion of said actual torque-rotation curve;
and control means responsive to said derived tightening torque signal for stopping said driving means.

2. Apparatus according to claim 1 wherein said control means include comparison means responsive to said first torque signal and said derived tightening torque signal for comparing the torque imparted to said fastener with the derived tightening torque and for developing a control signal when said first torque signal is equal to said derived tightening torque signal.

3. Apparatus in accordance with claim 1 wherein said gradient calculating means include:
first delay means responsive to the first torque signal and the angle signal for delaying said first torque signal for a predetermined rotation of the fastener;
and first comparison means responsive to said first torque signal and said delayed first torque signal for developing said gradient signal.

4. Apparatus in accordance with claim 3 wherein the gradient calculating means include gate means responsive to said gradient signal for developing a gate signal at the onset of the substantially linear tightening portion of the actual torque-rotation curve.

5. Apparatus in accordance with claim 4 wherein said gate means include:
second delay means responsive to said gradient signal and said angle signal for delaying said gradient signal for a predetermined rotation of the fastener;
and second comparison means responsive to said gradient signal and said delayed gradient signal for developing said gate signal.

6. Apparatus in accordance with claim 5 wherein said second comparison means develop said gate signal when said gradient signal and said delayed gradient signal are essentially equal.

7. Apparatus for tightening an assembly including a threaded fastener to a desired preload comprising:
driving means for imparting torque and rotation to the fastener to tighten said assembly, the actual torque-rotation curve for said assembly having a non-linear tightening portion followed by a substantially linear tightening portion;

torque sensing means responsive to said driving means for developing a first torque signal representative of the torque imparted to said fastener;

angle sensing means responsive to said driving means for developing an angle signal representative of the rotation imparted to said fastener;

gradient calculating means responsive to said first torque signal and said angle signal for developing a calculated gradient signal representative of the calculated gradient of said substantially linear tightening portion of said actual torque-rotation curve;

means for storing (1) a plurality of gradient signals representative of the gradients of the substantially linear tightening portions of a plurality of possible torque-rotation curves for said assembly, and (2) a plurality of tightening torque signals representative of a family of tightening torque curves which define the relationships between a plurality of preloads which may be induced in said fastener and said gradients of the substantially linear tightening portions of said possible torque-rotation curves;

selection means for selecting a desired preload which is to be induced in said fastener;

means responsive to said selection means, said calculated gradient signal, and said stored gradient signals for deriving from said plurality of torque signals that tightening torque signal representative of the torque defined by the relationship of said selected desired preload and said stored gradient which is closest in magnitude to said calculated gradient of said substantially linear tightening portion of said actual torque-rotation curve;

and control means responsive to said derived tightening torque signal for stopping said driving means.

8. Apparatus for tightening an assembly including a threaded fastener to a desired preload comprising:

driving means for imparting torque and rotation to the fastener to tighten said assembly, the actual torque-rotation curve for said assembly having a non-linear tightening portion followed by a substantially linear tightening portion;

torque sensing means responsive to said driving means for developing a first torque signal representative of the torque imparted to said fastener;

angle sensing means responsive to said driving means for developing an angle signal representative of the rotation imparted to said fastener;

gradient calculating means responsive to said first torque signal and said angle signal for developing a calculated gradient signal representative of the calculated gradient of said substantially linear tightening portion of said actual torque-rotation curve;

means for storing (1) a plurality of gradient signals representative of the gradients of the substantially linear tightening portions of a plurality of possible torque-rotation curves for said assembly, and (2) a plurality of tightening torque signals representative of a family of tightening torque curves which define the relationships between a plurality of preloads which may be induced in said fastener and said gradients of the substantially linear tightening portions of said possible torque-rotation curves;

selection means for selecting a desired preload which is to be induced in said fastener;

means responsive to said selection means, said calculated gradient signal, and said stored gradient signals for:

(1) comparing said calculated gradient signal with said stored gradient signals to identify which of said stored gradient signals is closest in magnitude to said calculated gradient signal, and (2) deriving from said plurality of torque signals that tightening torque signal representative of the torque defined by the relationship of said selected desired preload and said stored gradient which is closest in magnitude to said calculated gradient of said substantially linear tightening portion of said actual torque-rotation curve;

and control means responsive to said derived tightening torque signal for stopping said driving means.

9. A method for tightening an assembly including a threaded fastener to which torque and rotation are imparted to induce a desired preload when said assembly has been tightened to a desired degree, the actual torque-rotation curve for said assembly having a non-linear tightening portion followed by a substantially linear tightening portion, said method comprising:

selecting a plurality of possible torque-rotation curves for said assembly;

determining the gradients of the substantially linear tightening portions of said plurality of possible torque-rotation curves;

establishing the tightening torques required to induce a desired preload in said fastener when said fastener is tightened according to said possible torque-rotation curves, one such tightening torque being associated with each gradient of said substantially linear tightening portion of said possible torque-rotation curves;

imparting torque and rotation to said fastener;

calculating the gradient of said substantially linear tightening portion of said actual torque-rotation curve;

comparing said calculated gradient of said substantially linear tightening portion of said actual torque-rotation curve with said gradients of said substantially linear tightening portions of said plurality of possible torque-rotation curves and determining which of said gradients of said substantially linear tightening portions of said plurality of possible torque-rotation curves is closest in magnitude to said gradient of said calculated substantially linear tightening portion of said actual torque-rotation curve;

deriving the tightening torque associated with said gradient closest in magnitude to said calculated gradient of said substantially linear tightening portion of said actual torque-rotation curve;

determining when said torque imparted to said fastener is equal to said derived tightening torque;

and ceasing to impart torque and rotation to said fastener when said torque imparted to said fastener is equal to said derived tightening torque.

* * * * *